United States Patent

[11] 3,612,186

| [72] | Inventor | Jerome L. Fueslein<br>Linden, Calif. |
|---|---|---|
| [21] | Appl. No. | 888,684 |
| [22] | Filed | Dec. 29, 1969 |
| [45] | Patented | Oct. 12, 1971 |
| [73] | Assignee | International Harvester Company<br>Chicago, Ill. |

[54] LEVELING MECHANISM
3 Claims, 7 Drawing Figs.

[52] U.S. Cl. ................................................. 172/421,
172/423, 280/43.23
[51] Int. Cl. ....................................................... A01b 63/22
[50] Field of Search ................................................ 172/421,
422, 383, 240, 315, 316, 395, 400, 413;
280/43.13, 43.23

[56] References Cited
UNITED STATES PATENTS

| 2,464,615 | 3/1949 | Sawall | 172/421 X |
|---|---|---|---|
| 3,202,225 | 8/1965 | Richardson | 172/421 X |
| 1,434,287 | 10/1922 | Gutridge et al. | 172/421 |
| 2,208,526 | 7/1940 | Gurries | 172/421 |
| 2,581,533 | 1/1952 | Hipple | 172/383 |

*Primary Examiner*—Robert E. Pulfrey
*Assistant Examiner*—Stephen C. Pellegrino
*Attorney*—Noel G. Artman ABSTRACT: In an earth-scraping implement of the transversely elongated type supported by laterally spaced wheels which can be vertically moved to raise and lower the implement, the wheels are mounted on arms affixed to and projecting from a transverse rockshaft formed of two parts, one of which can be angularly adjusted relative to the other to level the bowl and scraper blade.

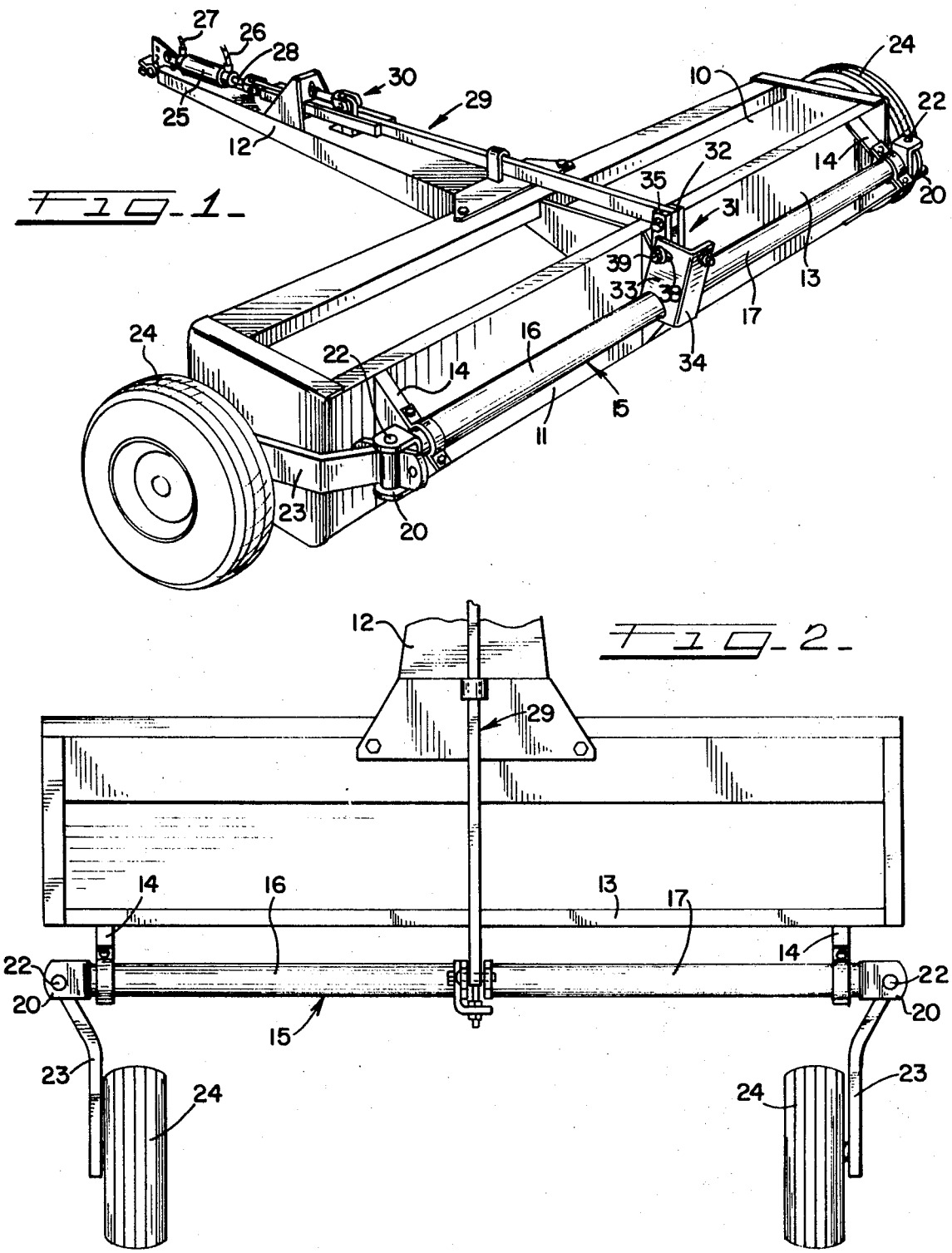
INVENTOR
JEROME L. FUESLEIN
BY
ATT'Y.

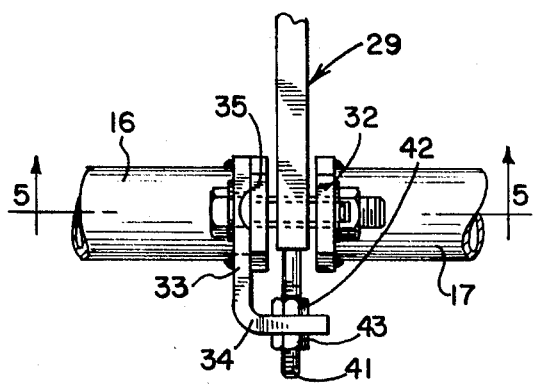
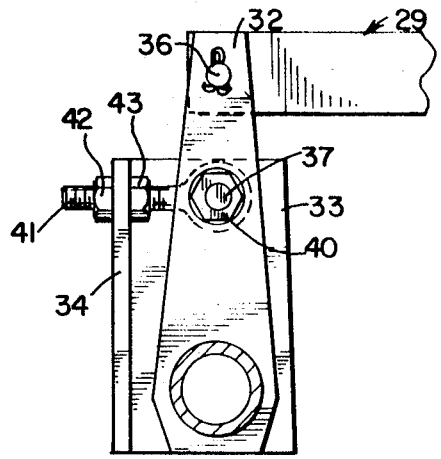
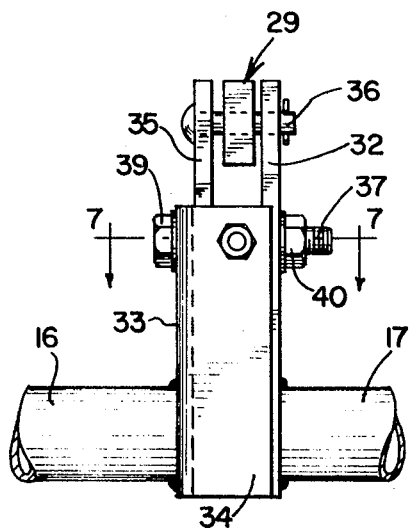
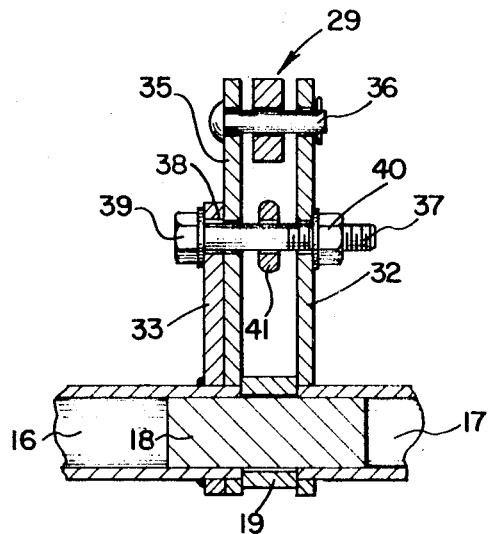
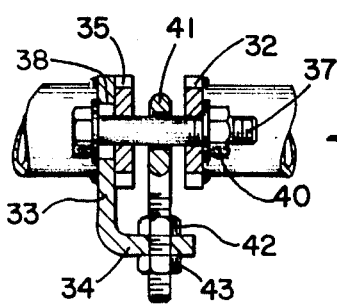
INVENTOR
JEROME L. FUESLEIN
BY
ATT'Y.

LEVELING MECHANISM

BACKGROUND OF THE INVENTION

This invention relates to earthworking implements and particularly to scrapers. More specifically, the invention concerns novel means for leveling an earth scraper.

The blade of an earth scraper removes elevations and fills depressions and also forms trenches for irrigation and the like, the earth accumulating against the backwall of the bowl and being dumped, when desired, by raising the bowl.

The wheels supporting the implement are mounted in a fixed relationship while being vertically movable to raise and lower the bowl. In some conditions the ground contour is such that one wheel tends to rise higher than the other, tilting the blade. To compensate for this, the present invention has as its object the provision of means whereby the relative vertical positions of the wheels can be varied to compensate for the variation in elevation, and maintain the blade level.

Another object of the invention is the provision, in an earth scraper or the like, of a sectional wheel-supporting rockshaft wherein one wheel-carrying section can be angularly adjusted relative to the other.

DESCRIPTION OF THE DRAWINGS

FIG. 1 is a perspective view of an earth scraper incorporating the features of this invention and showing the supporting wheels in position for use of the implement for irrigation purposes;

FIG. 2 is a diagrammatic plan view of the implement of this invention showing the position of the wheels when the implement is used for ground scraping or leveling;

FIG. 3 is an enlarged detail in plan of a portion of the structure shown in FIG. 2;

FIG. 4 is a rear elevation of the structure shown in FIG. 3;

FIG. 5 is a section taken on the line 5—5 of FIG. 3;

FIG. 6 is a side elevation of the structure shown in FIGS. 3 and 4; and

FIG. 7 is a section taken on the line 7—7 of FIG. 4.

DESCRIPTION OF THE PREFERRED EMBODIMENT

In the drawings the numeral 10 designates the transversely elongated bowl of a land scraper and leveler having an earth-engaging blade 11 and a forwardly projecting hitch 12 having conventional means thereon for pivotally connecting the implement to a tractor, not shown.

The bowl 10 is of conventional construction and has affixed to and projecting rearwardly from its real wall 13 a pair of laterally spaced brackets 14 rotatably receiving the ends of a transverse rockshaft assembly 15 comprising left- and right-hand sections 16 and 17 of tubular construction, the inner ends of which are rotatably mounted on a bearing 18 carried by a central bracket 19 affixed to the rear wall 13 of the bowl. See FIG. 5.

Clevises 20 are affixed to the ends of shaft assembly 15 and each clevis carries a pivot pin 22 upon which is mounted one end of a wheel carrier in the form of an arm 23 having mounted on its other end a supporting wheel 24.

Wheels 24 are swung vertically to raise and lower the frame by rocking the shaft sections 16 and 17. In the case of the irrigation position of the wheels in FIG. 1 shaft structure 15 is rocked counterclockwise to lower the wheels and raise the implement frame with its bowl and blade, and clockwise to raise the wheels and lower the implement to its operating position. The reverse of this procedure is followed when the wheels are in the scraping or leveling position of FIG. 2.

Power transmission means in the form of a hydraulic cylinder 25 supplied with fluid under pressure through hose lines 26 and 27 from a source on the tractor, not shown, is provided to oscillate the rockshaft assembly 15. Piston rod 28, extendable and retractable in the cylinder, is connected to one end of a connector link 29 forming part of a double-acting adjustable stop mechanism indicated at 30, the function and constructional details of which, with link 29, form no part of the present invention but is described in detail in copending U.S. application Ser. No. 888,685 filed Dec. 29, 1969 (D-9145).

The rear end of link 29 is pivotally connected to a rock arm assembly 31 shown in detail in FIGS. 3 to 6. A first arm 32 is affixed, as by welding, to the inner end of right-hand shaft section 17 and another somewhat shorter arm 33 is welded to the inner end of left-hand shaft section 16 and is L-shaped to provide a flange 34 serving a function to be hereinafter set forth.

A floating arm 35 is mounted on the inner end of shaft section 16 adjacent arm 33 for pivoting movement relative thereto, and the rear end of link 29 is pivotally mounted on a pin 36 carried between the upper ends of arms 32 and 35. Thus, operation of cylinder 25 and extension and retraction of link 29 rocks arm 32 and right-hand shaft section 17.

The movement of link 29 is transmitted to left-hand rock arm 33 and shaft section 16 through the intermediary of a bolt 37 extending through lower openings provided in arms 32 and 35 and through a slot 38 in the longitudinally extending portion of arm 33, bolt 37 being provided with a head 39 engageable with the outer face of arm 33. A nut 40 on the threaded end of bolt 37 secures arms 32, 33 and 35 together to function as a unit so that operation of cylinder 25 rocks the shaft sections 16 and 17 in the desired direction as a unit.

As pointed out before, it is sometimes necessary to vary the relative vertical positions of one of the wheels 24 relative to the other to level the blade 11. This is accomplished by angularly adjusting one of the shaft sections, and therefore one of the wheel carriers relative to the other. For this purpose an eyebolt 41 is mounted on bolt 37 between arms 32 and 35 and its threaded shank is slidably receivable in an opening provided in the flange portion 34 of arm 33. By loosening nut 40 and adjusting eyebolt 41 arm 33 and shaft section 16 can be angularly adjusted relative to arm 32 and shaft section 17 within the limits of slot 38, the eyebolt being secured in the adjusted angular position of arm 33 by the provision of locknuts 42 and 43.

With the parts of rock arm assembly 31 fastened together as noted, operation of cylinder 25 acting through piston rod 28 and connector link 29 transmits power through the rock arm assembly 31 to rock the shaft assembly 15 to raise and lower the wheels.

What is claimed is:

1. In an implement having a frame adapted for connection to a tractor, transverse shaft means rockably mounted on the frame, laterally spaced wheel-carrying arms mounted on a shaft means, power-operated means mounted on a frame and having a connection with said shaft means for rocking the latter to swing said wheel-carrying arms vertically between positions corresponding to the operating and transport positions of the implement, an angular adjustment means operable independently of said power-operated means for angularly adjusting one of said wheel-carrying arms about the axis of said shaft means relative to the other of said wheel-carrying arms and holding said arms in a selected adjusted position to level the implement, said shaft means including a pair of aligned wheel-carrying sections rockably mounted on the frame to which said wheel-carrying arms are secured and a lever secured to the inner end of each of said sections, means being provided for operatively connecting the power-operated means to said levers for rocking said wheel-carrying sections simultaneously, adjustable means forming the connection between the power-operated means in one of said levers to angularly adjust said one of said levers relative to the other and thereby vary the vertical positions of said wheel-carrying arms, and wherein a floating arm is mounted on the axis of said shaft means for pivoting relative thereto, pin means forming a connection between said levers and said floating arm, the connection of said pin means to said one of said levers including means for accommodating angular movement of said one of said levers relative to the other, and said adjustable means being connected between said one of said levers and said floating arm.

2. The invention set forth in claim 1, wherein a slot is provided in said one of said levers to receive said pin and the adjustable means shifts the position of the pin in said slot to angularly adjust one of said shaft sections relative to the other.

3. The invention set forth in claim 2, wherein said shaft means includes a central section on which the inner ends of said wheel-carrying sections are rockably mounted and said floating arm is pivotally mounted on the central section between the levers on said wheel-carrying sections.